United States Patent
Abdullah et al.

(10) Patent No.: US 8,625,410 B2
(45) Date of Patent: Jan. 7, 2014

(54) DUAL HOMED E-SPRING PROTECTION FOR NETWORK DOMAIN INTERWORKING

(75) Inventors: Bashar Abdullah, Ottawa (CA); Marc Holness, Nepean (CA); Paul Bottorff, Portola Valley, CA (US); Bernard St-Denis, Ottawa (CA)

(73) Assignee: Ciena Corporation, Hanover, MD (US)

( * ) Notice: Subject to any disclaimer, the term of this patent is extended or adjusted under 35 U.S.C. 154(b) by 150 days.

(21) Appl. No.: 12/463,827

(22) Filed: May 11, 2009

(65) Prior Publication Data

US 2010/0284413 A1     Nov. 11, 2010

(51) Int. Cl.
*H04L 12/28* (2006.01)
*G01R 31/08* (2006.01)
*G06F 15/173* (2006.01)

(52) U.S. Cl.
USPC ........... 370/222; 370/221; 370/225; 370/389; 370/256; 709/238

(58) Field of Classification Search
None
See application file for complete search history.

(56) References Cited

U.S. PATENT DOCUMENTS

| | | | |
|---|---|---|---|
| 7,269,132 B1 | 9/2007 | Casey et al. | |
| 7,345,991 B1 | 3/2008 | Shabtay et al. | |
| 7,477,593 B2* | 1/2009 | Scudder et al. | 370/217 |
| 7,551,551 B2* | 6/2009 | Filsfils et al. | 370/219 |
| 7,760,738 B1* | 7/2010 | Chamas et al. | 370/395.21 |
| 8,184,648 B2* | 5/2012 | Allan et al. | 370/403 |
| 2002/0118687 A1 | 8/2002 | Chow et al. | |
| 2004/0174828 A1 | 9/2004 | Elie-Dit-Cosaque et al. | |
| 2006/0164975 A1* | 7/2006 | Filsfils et al. | 370/225 |
| 2008/0062891 A1* | 3/2008 | Van der Merwe et al. | 370/254 |
| 2009/0059800 A1 | 3/2009 | Mohan | |
| 2009/0147674 A1* | 6/2009 | Scudder et al. | 370/225 |
| 2009/0168647 A1* | 7/2009 | Holness et al. | 370/228 |
| 2009/0274155 A1* | 11/2009 | Nakash | 370/395.53 |
| 2009/0316571 A1* | 12/2009 | Rose | 370/218 |
| 2010/0098071 A1* | 4/2010 | Zhang | 370/389 |
| 2010/0226260 A1* | 9/2010 | Zinjuvadia et al. | 370/248 |
| 2012/0033666 A1* | 2/2012 | Holness et al. | 370/389 |

FOREIGN PATENT DOCUMENTS

WO     WO 2010124355 A1 * 11/2010

OTHER PUBLICATIONS

ITU-T, Ethernet ring protection switching, G.8032/Y.1344, Jun. 2008, ITU-T, 1-37.*

(Continued)

*Primary Examiner* — Hassan Phillips
*Assistant Examiner* — Hicham Foud
(74) *Attorney, Agent, or Firm* — Clements Bernard PLLC; Christopher L. Bernard; Lawrence A. Baratta, Jr.

(57) ABSTRACT

A system for controlling packet forwarding through a dual-homed connection between first and second network domains, the dual-homed connection including two peer nodes connected to the first and second network domains. A sub-ring network is instantiated in the first network domain, and includes at least two nodes connected in a linear topology between a pair of end-nodes. Each end-node corresponds with a respective one of the peer nodes. A virtual link through the second network domain for conveys traffic of the sub-ring network between the peer nodes, and closes the sub-ring network to define a ring topology. Each of the nodes of the sub-ring network is controlled to forward packets of the sub-ring network in accordance with a ring network routing scheme.

18 Claims, 4 Drawing Sheets

(56) References Cited

OTHER PUBLICATIONS

ITU-T, Ethernet ring protection switching (Amendment 1: Interconnection of Ethernet rings), G.8032/Y.1344, Apr. 2009, ITU-T, 1-12.*

International Telecommunication Union, Recommendation ITU-T G.8032/Y.1344, Jun. 2008, 44 Pages.

International Search Report issued Mailed Aug. 24, 2010 on Applicant's corresponding PCT International Patent Application No. PCT/CA2010/000664 filed May 6, 2010, 5 Pages.

* cited by examiner

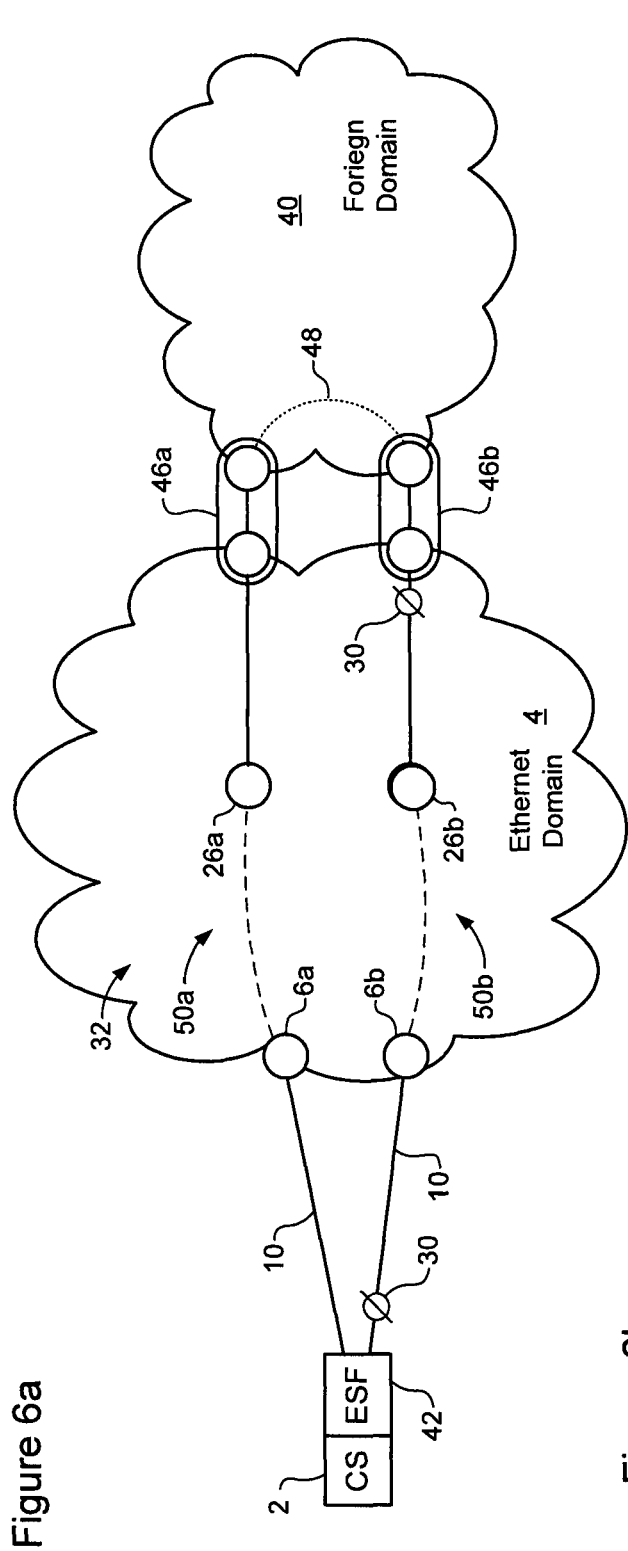
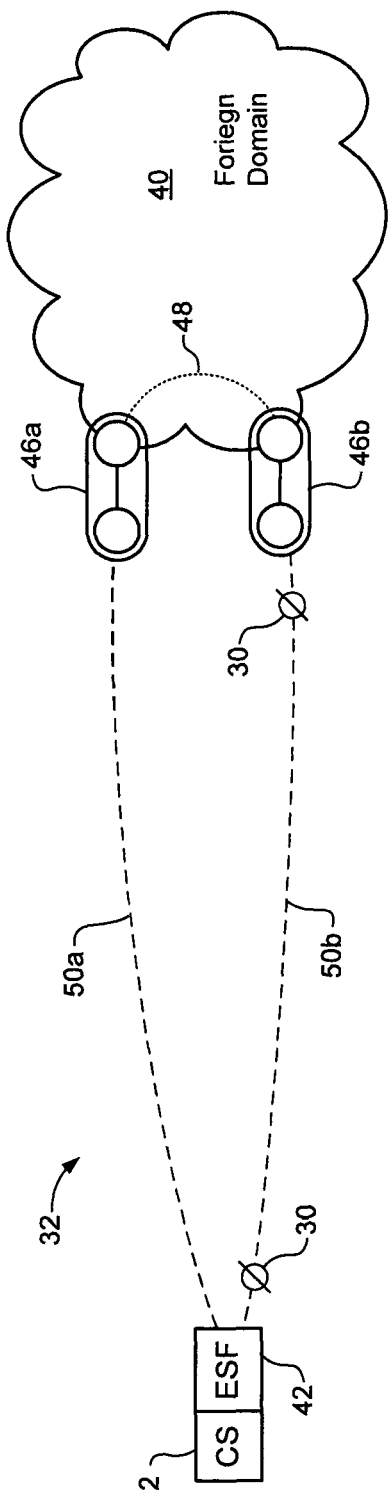
Figure 6a
Figure 6b

DUAL HOMED E-SPRING PROTECTION FOR NETWORK DOMAIN INTERWORKING

TECHNICAL FIELD

The present invention relates to management of traffic forwarding in packet networks, and in particular to methods of preventing loops in multicast routes mapped through a packet network.

BACKGROUND OF THE INVENTION

Ethernet is increasingly popular as a transport network for high speed Wide Area Network (WAN) communications. Various techniques have been developed to enable the deployment of Ethernet transport networks with a mesh topology. Among other things, these enable the provisioning of topologically diverse paths for traffic protection, while preventing the formation of loops within the network.

Referring to FIG. 1a, Split Multi Link Trunking (SMLT), which is described in Applicant's U.S. Pat. No. 7,269,132 provides a technique by which a client system (CS) 2 can be connected to an Ethernet network domain 4 though a pair of peer Ethernet Switches (ESs) 6a-b. In very general terms, a Split Link Aggregation Group (SLAG) 8 is defined, which comprises a plurality of parallel links 10 (in FIG. 1a, the SLAG comprises two parallel links). At one end of the SLAG 8, the links 10 are connected to the CS 2 via an aggregator function 12, which serves to distributed packet traffic across the links 10 of the SLAG 8. At the opposite end of the SLAG 8, each link 10 is connected to a respective ES 6, via a corresponding instance of a distributed aggregator function 14. This arrangement provides a "dual homed" connection to the Ethernet domain 4, and facilitates load balancing and inherent resiliency. In order to prevent network instability and loops, complex algorithms must be implemented to coordinate the operations of the peer ESs 6a-b. Typically, this involves controlling the distributed aggregator function 14 and the involved peer ESs 6 to emulate a single aggregator/ES system which mirrors the CS/aggregator system 2,12 at the other end of the SLAG 8.

Referring to FIG. 1b, dual homing is also known for connecting neighboring network domains. In the example illustrated in FIG. 1b, an Ethernet domain 4 may be connected to a Provider Backbone Transport (PBT) network domain 16 via a pair of peer gateways 18a-b. Within each domain, respective processes can be used to compute paths and install traffic forwarding information to enable end-to-end connectivity. For example, spanning tree protocol may be used to compute paths in Ethernet and PBT network domains, while MPLS may be used in an IP domain. As in the case of Split Multi Link Trunking, it is normally necessary to implement complex algorithms in each of the peer gateways 18 to prevent the formation of loops.

For example, consider a scenario in which an Ethernet domain 4 is connected to a PBT network domain 16 via a pair of peer gateways 18, as shown in FIG. 1b. In each network domain, spanning tree protocol is used to compute paths and prevent the formation of loops. However, by definition, paths are computed in each domain independently. As a result, there is, in principle, nothing to prevent a path 20 between the two peer gateways 18 being set up through the Ethernet domain 4, and a second path 22 between the two gateways 18 being set up through the PBT domain 16. Within each domain, each path 20,22 is guaranteed to be loop free, by operation of STP. However, taken together the two paths form a loop which, under some circumstances, could destabilize the network. Typically, this problem is addressed by implementing special algorithms in the peer gateways 18 and/or one of the network domains, to coordinate operations of the two peer gateways 18 so as to prevent packets from looping. For example, in some cases, forwarding information in each gateway 18 may be arranged to force traffic through only one of the two gateways 18.

A simpler method that enables resilient connection of an Ethernet domain to another network domain remains highly desirable.

SUMMARY OF THE INVENTION

Thus, an aspect of the present invention provides a system for controlling packet forwarding through a dual-homed connection between first and second network domains, the dual-homed connection including two peer nodes connected to the first and second network domains. A sub-ring network is instantiated in the first network domain, and includes at least two nodes connected in a linear topology between a pair of end-nodes. Each end-node corresponds with a respective one of the peer nodes. A virtual link through the second network domain conveys traffic of the sub-ring network between the peer nodes, and closes the sub-ring network to define a ring topology. Each of the nodes of the sub-ring network is controlled to forward packets of the sub-ring network in accordance with a ring network routing scheme.

An advantage of the present invention is that a ring network routing scheme is used to control traffic forwarding through the dual-homed connection, independently of the physical typology of the network. This enables simple and robust protection switching functionality, high speed failure recovery and guaranteed loop freeness, without the need for complex algorithms to coordinate behaviours of the involved peer nodes.

BRIEF DESCRIPTION OF THE DRAWINGS

Further features and advantages of the present invention will become apparent from the following detailed description, taken in combination with the appended drawings, in which:

FIGS. 6a and 6b schematically illustrate a dual-homed connection implemented using a sub-ring network in accordance with a third embodiment of the present invention.

It will be noted that throughout the appended drawings, like features are identified by like reference numerals.

DETAILED DESCRIPTION OF THE PREFERRED EMBODIMENT

The present invention provides a method of supporting dual homed interworking between an Ethernet network domain and a foreign network domain. Embodiments of the invention are described below, by way of example only, with reference to FIGS. 2-6.

Figure 2:
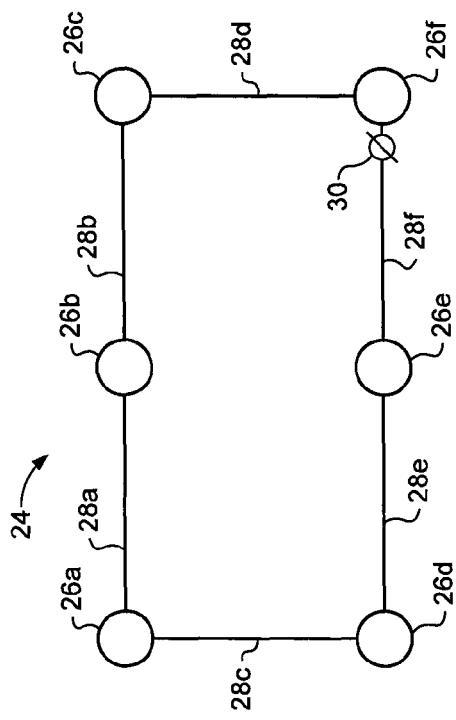
FIG. 2 schematically illustrates a network having a ring topology known, for example, from ITU/T recommendation G.8032.

ITU-T SG15/Q9 recommendation G.8032 (June, 2008) describes protection switching in an Ethernet ring. Referring to FIG. 2, an Ethernet ring 24 is an Ethernet network comprising nodes 26 and links 28 connected together in a ring topology. One of the links of the ring is designated as a Ring Protection Link (RPL), and is disabled during normal operation of the ring by placing a channel block 30 on that link. Typically, a channel block 30 is imposed at a node at one end of the RPL, which node may then be referred to as the RPL Owner. In some cases, the channel block 30 may, for example, comprise a policy that prevents packets of the ring from being forwarded through a port hosting the RPL. With such a channel block 30 in place, the ring 24 is guaranteed to be loop free, and conventional Ethernet MAC-learning and path computation can be used to compute and install appropriate forwarding information in each node 26 of the ring 24.

As described in ITU-T recommendation G.8032, a failure of either a link 28 or a node 26 of the ring 24 will be detected by the two nodes 26 nearest the point of failure. Both of these nodes will send a Failure Indication Message (FIM) to their nearest neighbor nodes in the ring, and these FIMs will be propagated, in opposite directions, around the ring 24. Upon receipt of a FIM, each node 26 flushes its forwarding database (FDB), and forwards the FIM to the next node on the ring 24. In addition, the RPL-Owner will remove the channel block 30. This effectively enables connectivity within the ring 24 to be re-established using conventional Ethernet flooding and MAC learning functionality.

An advantage of ITU-T recommendation G.8032 is that it utilizes conventional Ethernet path labeling and packet forwarding techniques to implement a ring network. However, ITU-T recommendation G.8032 contemplates an arrangement in which the ring network is defined entirely within a given Ethernet network domain.

The present invention provides a sub-ring network, and techniques for using the sub-ring to enable dual homed interworking with high speed protection switching and guaranteed loop freeness.

Figure 3:
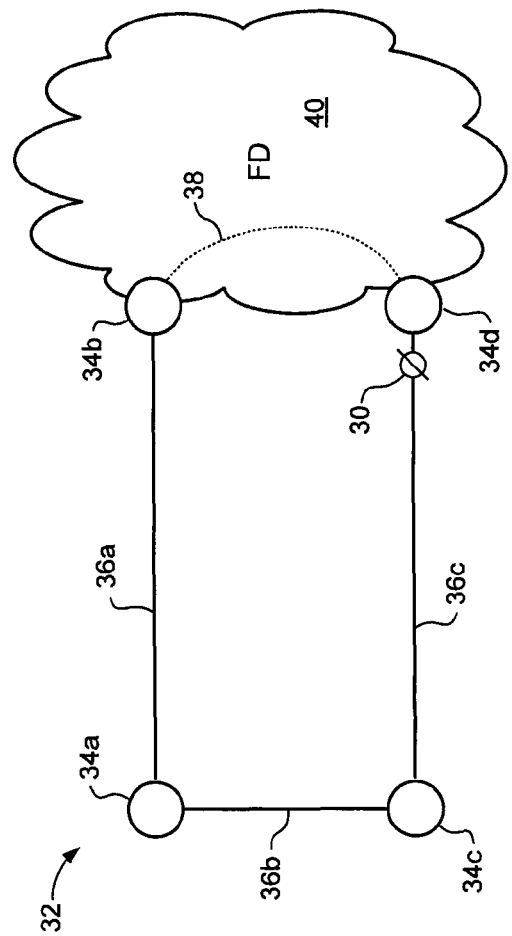
FIG. 3 schematically illustrates a sub-ring network in accordance with a representative embodiment of the present invention.

Referring to FIG. 3, a sub-ring network 32 is an Ethernet network (or sub-network) which includes two or more neighbor nodes 34 interconnected by links 36 to form a linear path extending between two "end-nodes" (nodes 34*b* and 34*d* in FIG. 3). A virtual connection (or link) 38 is set up through a foreign network domain 40 between the two end-nodes 34*b* and 34*d*. As may be seen in FIG. 3, the virtual link 40 "closes" the sub-ring network to provide a ring-topology. In the context of the present invention, the foreign network domain 40 refers to any network domain that is not part of the sub-ring 32 itself, but is otherwise capable of providing a path to transport packets between the two end nodes (34*b* and 34*d* in FIG. 3).

In order to guarantee loop-freeness, one of the end-nodes (34*d* in FIG. 3) is designated as an RPL-Owner, and the link connecting the RPL-Owner to its nearest neighbor on the sub-ring 32 (node 34*c* in FIG. 3) is designated as the RPL. A channel block 30 is imposed on the RPL in order to prevent packet forwarding through the RPL during normal operations of the sub-ring network 32. With this arrangement, traffic forwarding, channel blocking and protection schemes of the type known, for example, from ITU-T recommendation G.8032 described above can be implemented in the sub-ring network 32, with packet transport through the virtual link 38 to ensure continuity of the ring topology.

In some embodiments, sub-ring control messages, such as Failure Indication Messages can be transported through the virtual link 38. In other cases, sub-ring control messages can be terminated at the end-nodes, so that they are not forwarded through the virtual link 38. This later option is workable because the virtual link 38 emulates a direct physical link between the two end nodes, and it is only the end nodes that will act upon any sub-ring control messages sent through the virtual link 38. However, the topology of the sub-ring network 32 ensures that all of the nodes of the sub-ring, including the end nodes, will automatically receive all sub-ring control messaging through the sub-ring itself, and it is not necessary to forward control messages through the virtual link 38 in order to guarantee this outcome. Thus, proper traffic forwarding and protection switching functionality of the sub-ring network 32 can be obtained without sending sub-ring control messages through the virtual link 38.

The sub-ring network 32 of FIG. 3 is composed of four neighbor nodes 34*a-d*, but this is not essential. In fact, a sub-ring network 32 can be composed of as few as two neighbor nodes 34, both of which would, in such cases, be end-nodes.

Figure 1A:
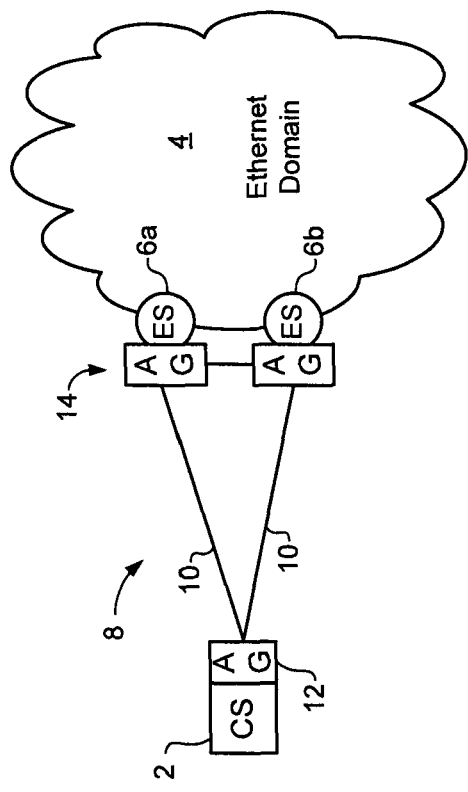
FIGS. 1a and 1b schematically illustrate respective different dual-homed connections known in the art.
Figure 1B:
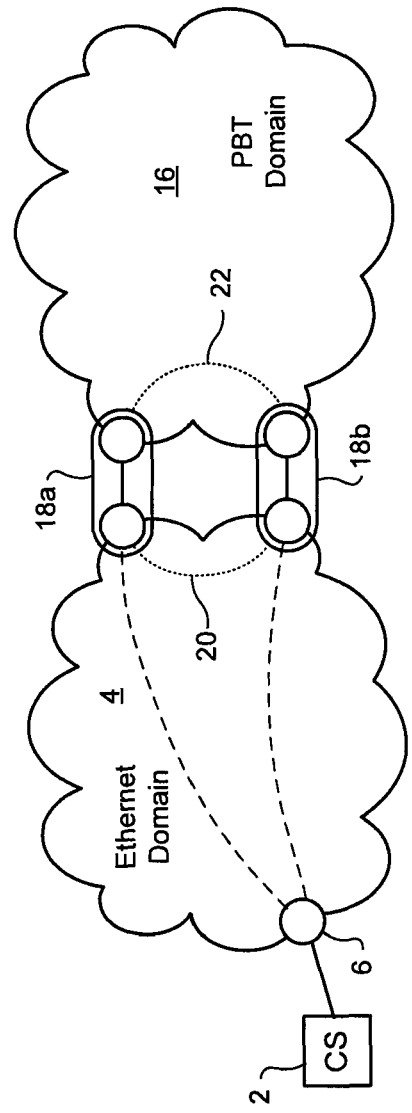
Figure 4:
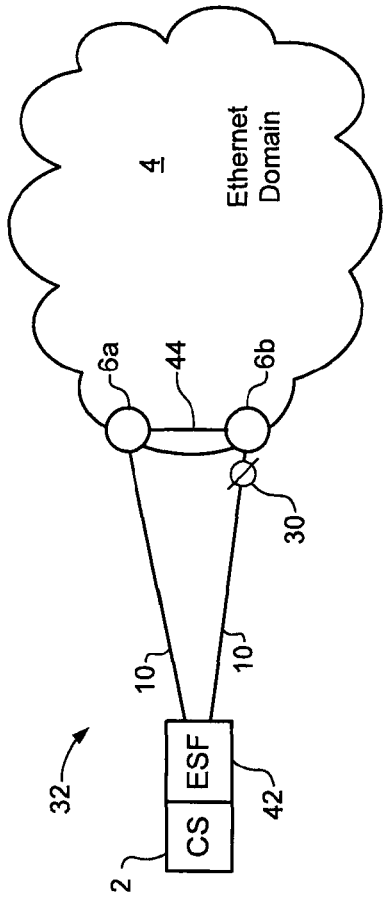
FIG. 4 schematically illustrates a dual-homed connection implemented using a sub-ring network in accordance with a first embodiment of the present invention.

FIG. 4 illustrates a representative embodiment, in which a 3-node sub-ring network 32 is used to establish a dual-homed connection between a client system (CS) 2 and an Ethernet network domain 4. The CS 2 may, for example, be a computer system or a local area network (LAN) at a client site, and is connected to the Ethernet domain 4 via a pair of links 10 and Ethernet switches 6, in a manner similar to that described above with reference to FIG. 1*a*. Typically, an Ethernet Switching function (ESF) 42 may be implemented at the client site to facilitate traffic forwarding between the CS 2 and the Ethernet domain 4. The ESF 42 may be implemented using an Ethernet Switch connected to the CS 2 or by means of suitable software implemented on the CS 2 itself, if desired.

In the embodiment of FIG. 4, the sub-ring network 32 comprises the ESF 42 at the client site and the pair of Ethernet Switches (ESs) 6 of the Ethernet domain 4, which also serve as end-nodes of the sub-ring 32. A conventional Ethernet path 44 is set up through the Ethernet domain 4 between the two ESs 6 to provide a virtual connection which closes the ring topology of the sub-ring network 32. One of the ESs 6 is designated as the RPL-Owner, and imposes a channel block 30 on its link 10 to the ESF 42 so as to guarantee loop freeness of the sub-ring network 32.

With this arrangement, traffic forwarding, channel blocking and protection schemes of the type known, for example, from ITU-T recommendation G.8032 can be implemented to control packet flows to and from the CS 2. End-to-end connectivity between the CS 2 and addresses reachable through the Ethernet domain 4 can be established by means of conventional MAC learning and path computation techniques to set up paths (not shown in FIG. 4 extending from either one or both of the two peer ESs 6. Once these paths have been set up through the Ethernet domain 4, packet flows to and from the CS 2 can be properly routed through the appropriate ES 4 via the active link 10 of the sub-ring 32 and the path 44 between the two ESs 6.

Within the Ethernet domain 4, loop-freeness is ensured by conventional algorithms (such as STP or IS-IS, for example) known in the art. Loop-freeness through the dual homed connection between the CS 2 and the Ethernet domain 4 is ensured by the channel block 30, which forces all traffic to and from the CS 2 to traverse the active (non-blocked) link 10. However, in the event of a failure of the active link 10, the ring topology of the dual-homed connection means that traffic can be rapidly re-routed to restore end-to-end connectivity, without requiring new paths to be computed through the Ethernet domain 4.

An advantage of the arrangement of FIG. 4 is that sophisticated algorithms are not required to coordinate the behaviours of the peer ESs 6. Rather, each ES 6 can implement conventional path computation and traffic forwarding methods, because the sub-ring network 32 ensures loop-free traffic flows between the peer ESs 6 and the CS 2.

Figure 5:
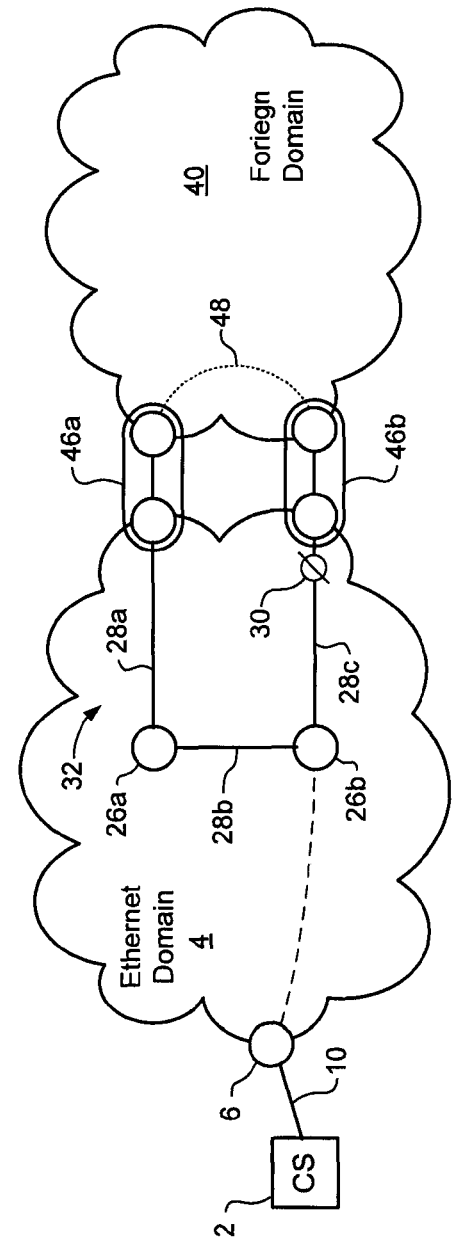
FIG. 5 schematically illustrates a dual-homed connection implemented using a sub-ring network in accordance with a second embodiment of the present invention.

FIG. 5 illustrates a further representative embodiment, in which a 4-node sub-ring network 32 is used to establish a dual-homed connection between an Ethernet domain 4 and a foreign network domain 40 which are interconnected via a pair of peer gateways 46. In this embodiment, the foreign network domain 40 may be any network domain operating under an administrative management scheme that is independent of that of the Ethernet domain 4. The foreign network domain 40 could, for example, be another Ethernet domain, an IP domain, a Provider Backbone Transport (PBT) domain, a Multi-Protocol Label Switching (MPLS) domain, a Virtual Private LAN Service (VPLS) domain, or any other network domain capable of supporting packet traffic flows.

In the embodiment of FIG. 5, the sub-ring network 32 comprises two nodes 26 of the Ethernet domain 4 and the two peer gateways 46 which also serve as end-nodes of the sub-ring 32. One of the gateways 46 is designated as the RPL-Owner, and imposes a channel block 30 on the link to its nearest neighbor node 26 on the sub-ring 32, so as to guarantee loop freeness of the sub-ring network 32. A path 48 is mapped through the foreign network domain 40 between the two gateways 46 to provide a virtual connection which closes the ring topology of the sub-ring network 32. For example, in the case of an IP network domain, the path 48 may be set up as a label switched path computed using MPLS, for example. In the case of a PBT domain, the path 48 may be a least-cost path computed using a Djikstra algorithm. Other methods of computing the path 48 for the virtual connection between the two gateways 46 may be used, as desired.

With the arrangement of FIG. 5, traffic forwarding, channel blocking and protection schemes of the type known, for example, from ITU-T recommendation G.8032 can be implemented to control packet flows within the sub-ring 32, and thus between the two interconnected network domains 4, 40. Within the Ethernet domain 4, conventional packet forwarding and path computation schemes can be used to ensure loop freeness of traffic flows to and from the sub-ring 32. Conventional traffic forwarding protocols can be implemented in the foreign network domain 40 to convey traffic to and from the peer gateways 46. In some networks (e.g. PBT networks) these protocols also ensure loop freeness within the foreign domain 40. In other cases (e.g. IP networks), loop freeness is not guaranteed. However, even where loop freeness within the foreign network domain 40 is not guaranteed, the operation of the sub-ring 32 effectively insulates the Ethernet domain 4 from any looping traffic, by forcing any given traffic flow to traverse the boundary between the two network domains 4,40 through only one of the two gateways 46.

An advantage of the arrangement of FIG. 5 is that sophisticated algorithms are not required to coordinate the behaviours of the peer Gateways 46. Rather, each Gateway 46 can implement conventional protocol translation and packet forwarding strategies for each network domain, because the sub-ring network 32 ensures loop-free traffic flows between the two network domains.

As mentioned above, an advantage of, ITU-T recommendation G.8032 is that it utilizes conventional Ethernet path labelling and packet forwarding techniques to implement a ring network topology. These same techniques can be used to implement the sub-ring network 32 of FIGS. 3-5. Thus, for example, the sub-ring network 32 may be identified using a given Virtual Local Area Network (VLAN) identifier, or a Bearer VLAN identifier (BVID), and respective forwarding information computed for each node of the sub-ring 32 to provide proper forwarding of packets encapsulated with the VLAN (or BVID) of the sub-ring 32.

In the embodiment of FIG. 4, the same VLAN (or BVID) can be used to identify both the sub-ring links 10 and the virtual link 44. In the embodiment of FIG. 5, the foreign network domain 40 will assign an identifier to the virtual connection 48, which will normally not match the VLAN (or BVID) assigned to the sub-ring 32 in the Ethernet domain 4. In this case, each gateway 46 can implement conventional techniques to identify and properly route traffic of the sub-ring 32. For example, in an embodiment in which the virtual link 48 is a label-switched path set up through an IP network domain, each gateway 46 would implement a conventional encapsulation function in which packets bearing the VLAN (or BVID) of the sub-ring 32 are encapsulated and forwarded with the label assigned to the virtual link 48.

As may be appreciated, there may be as many sub-rings 32 as there are VLANs (or BVIDs) available to identify them. Thus, for example, in the embodiment of FIG. 5, it is possible to implement virtually any desired number of sub-rings 32 to control traffic flows between the two network domains 4, 40. Furthermore, each such sub-ring is defined on a per-VLAN (or per-BVID) basis, and so is independent of each of the other sub-rings. This implies that each sub-ring may be topologically similar or dissimilar from any other sub-ring, as desired. By suitable selection of the RPL of each sub-ring, it is therefore possible to use two or more sub-rings to achieve effective load balancing between the two gateways 46.

In some networks, it is common to assign a VLAN ID to identify traffic flows associated with a specific network service instance. For example, traffic flows belonging to a given customer may assigned a specific VLAN ID. Where the service instance requires double-homed interworking, sub-rings can be instantiated as required. For example, a first sub-ring may be instantiated to connect a customer site to the network, as described above with reference to FIG. 4. A second sub-ring may be instantiated to enable the customer to reach addresses in a foreign network domain, as described above with reference to FIG. 5. In some embodiments, each of the sub-rings instantiated for a given network service instance may use the same VLAN ID. If desired, different BVIDs may be assigned to each sub-ring (and/or connections between them) to facilitate network operations, administration and maintenance (OAM), while the use of a common VLAN ID facilitates traffic forwarding and accounting functions related to the involved service instance.

As mentioned above, a sub-ring network may have any desired number N≥2 of nodes. The embodiments described above with references to FIGS. 3-5 assume that the nodes and links of the sub-ring correspond with nodes and links of the physical network in which the sub-ring is implemented. However, this is not essential. FIG. 6a illustrates an embodiment in which a sub-ring 32 is extended across an Ethernet domain 4 from a client system (CS) 2 to a pair of peer gateways 46 providing connectivity to a foreign network domain 40. In this case, the CS 2 (or the ESF, as applicable) may be designated as a root node of the sub-ring 32, and the two gateways 46 are end-nodes as described above with reference to FIG. 5. As may be seen in FIG. 6a, each of the two spans 50 of the sub-ring 32 (respectively extending from the CS to each of the gateways) traverse at least the ESs 6 that host the physical links 10 to the CS 2, and possibly multiple intermediate nodes (not shown) between the ESs 6 and the gateways 46. However, provided that the two spans 50 traverse topologically diverse paths, the ring topology is preserved. Furthermore, since traffic leaves and joins the sub-ring network 32 only at the root node (i.e. the CS 2) and the two end-nodes (gateways 46), it is only actually necessary to implement ITU-T G.8032 channel blocking and protection switching functionality at these nodes. Any intermediate nodes traversed by the two spans 50 of the sub-ring 32 may implement a conventional traffic forwarding function in the same manner as for a conventional point-to-point path. As such, while the sub-ring 32 of FIG. 6a may traverse multiple physical nodes and links, only three nodes are required to implement special traffic forwarding and channel blocking functionality, so that the sub-ring 32 can be logically represented as a three-node sub-network, as illustrated in FIG. 6b.

As mentioned above, the sub-ring network 32 can be guaranteed to be loop-free by placing a channel block 30 on a link (designated as the RPL) of the sub-ring 32 at one of the end-nodes (designated as the RPL-Owner). Thus, in the embodiments of FIGS. 5 and 6a, a channel block 30 can be placed on a link 28 hosted by one of the gateways 46, which is designated as the RPL-Owner. However, in the embodiment of FIG. 6a packets flooded into the sub-ring 32 from the CS 2 will propagate through both spans 50 all the way to both gateways 46. It is only when packets being flooded through the "inactive" span 50b actually reach the RPL-Owner (gateway 46b) that the inactive span is actually identified as such and the packets discarded. This can lead to un-necessary packet flooding within the Ethernet network domain 4, which is undesirable.

A solution to this problem is to designate one span 50 (traversing any number of physical links) of the sub-ring 32 as the Ring Protection Span, and place channel blocks 30 at both ends of that span, as shown in FIG. 6b. With this arrangement, packets will only be "flooded" into the sub-ring network along the active span, which ensures MAC learning and forwarding information computation with minimal un-necessary packet flooding. In response to a network failure, failure indication messages will be propagated around the sub-ring in the manner described above with reference to FIG. 2 and ITU-T recommendation G.8032. In this case, however, there are two nodes designated as RPL-Owners, each of which will respond by removing its respective channel block to restore connectivity.

The embodiment(s) of the invention described above is (are) intended to be exemplary only. The scope of the invention is therefore intended to be limited solely by the scope of the appended claims.

We claim:

1. A system for controlling packet forwarding through a dual-homed connection between first and second network domains, the dual-homed connection comprising two peer nodes connected to the first and second network domains, the system comprising:

a sub-ring network instantiated in the first network domain and comprising at least two nodes connected in a linear topology between a pair of end-nodes, each end-node corresponding with a respective one of the peer nodes; and a virtual link through the second network domain for conveying traffic of the sub-ring network between the peer nodes, the virtual link closing the sub-ring network to define a ring topology;

wherein each of the nodes of the sub-ring network is controlled to forward packets of the sub-ring network and through the virtual link in accordance with an Ethernet ring protection routing scheme;

wherein one node of the sub-ring network is designated as a Ring Protection Link Owner that imposes a channel block on an adjacent link of the sub-network during normal operation of the sub-ring network thereby guaranteeing a loop free topology in both the first and second network domains and restores packet forwarding between the first and second network domains by removing the channel block in a failure mode of the sub-ring network;

wherein the Ethernet ring protection routing scheme operates in accordance with ITU-T SG15/Q9 recommendation G.8032 (February, 2008) with the sub-ring network and the virtual link forming a ring contained in separate domains comprising the first network domain and the second network domain; and wherein the Ethernet ring protection routing scheme operates in both the first and second network domains utilizing the virtual link in the second network domain for sending traffic without sending sub-ring control messages comprising Failure Indication Messages therethrough during all operations of the sub-ring network.

2. The system as claimed in claim 1, wherein one of the end-nodes is designated as the Ring Protection Link Owner.

3. The system as claimed in claim 1, wherein the first network domain is an Ethernet access network and the second network domain is an Ethernet network domain, and wherein the sub-ring network comprises an Ethernet switching function of a client system (CS) connected to a pair of peer Ethernet switches (ESs) of the Ethernet network domain via respective links to define a dual-homed connection between the CS and the Ethernet network domain.

4. The system as claimed in claim 3, wherein the virtual link comprises a connection through the Ethernet network domain between the peer Ethernet switches.

5. The system as claimed in claim 1, wherein the first network domain is an Ethernet network domain and the second network domain comprises a foreign network domain that is administered independently of the first network domain, and wherein each peer node is a gateway between the first and second network domains.

6. The system as claimed in claim 5, wherein the foreign network domain is any one of an Ethernet domain, an IP domain, a Provider Backbone Transport (PBT) domain, a Multi-Protocol Label Switching (MPLS) domain, and a Virtual Private LAN Service (VPLS) domain.

7. The system as claimed in claim 5, wherein the virtual link comprises a connection through the foreign network domain between the gateways.

8. The system as claimed in claim 5, wherein the nodes of the sub-ring are physical neighbour nodes of the first network domain.

9. The system as claimed in claim 5, wherein at least one node of the sub-ring is a root node logically connected to each gateway via a respective span of the sub-ring network, each span comprising two or more physical links of the network between the root node a respective one of the gateways and implementing traffic forwarding according to a linear routing scheme.

10. The system as claimed in claim 9, wherein one span of the sub-ring network is designated as a Ring Protection Span, and wherein respective channel blocks are imposed at opposite ends of the Ring Protection Span.

11. The system as claimed in claim 1, wherein the channel block for the Ethernet ring protection routing scheme is constrained to be only on an adjacent link of the end-nodes.

12. The system as claimed in claim 1, wherein a same Virtual Local Area Network Identifier is utilized to identify links on the sub-ring and the virtual link.

13. The system as claimed in claim 1, wherein a Virtual Local Area Network Identifier is utilized to identify links on the sub-ring and the second network domain assigns a different identifier to the virtual link with encapsulation functions used to forward traffic in the second network domain over the virtual link.

14. The system as claimed in claim 1, further comprising:
   a client system communicatively coupled to a first Ethernet switch in the first network domain and a second Ethernet switch in the first network domain;
   wherein a second channel block is placed on one of the links from the client system to the first network domain to minimize unnecessary packet flooding.

15. The system as claimed in claim 1, wherein the first network domain comprises an Ethernet network domain and the second network domain comprises one of an Internet Protocol domain, a Provider Backbone Transport (PBT) domain, and a Multi-Protocol Label Switching (MPLS) domain.

16. The system as claimed in claim 1, wherein each of the pair of end-nodes implements conventional protocol translation and packet forwarding strategies for each of the first network domain and the second network domain because the sub-ring network ensures loop-free traffic flows between the first network domain and the second network domain instead of requiring algorithms for coordination between the pair of end-nodes.

17. A method for controlling packet forwarding through a dual-homed connection between first and second network domains, comprising:
   operating the dual-homed connection between two peer nodes connected to the first and second network domains;
   operating a sub-ring network instantiated in the first network domain and comprising at least two nodes connected in a linear topology between a pair of end-nodes, each end-node corresponding with a respective one of the peer nodes;
   operating a virtual link through the second network domain for conveying traffic of the sub-ring network between the peer nodes, the virtual link closing the sub-ring network to define a ring topology;
   forwarding packets on the sub-ring and through the virtual link in accordance with ITU-T SG15/Q9 recommendation G.8032 (February, 2008) with the sub-ring and the virtual link forming a ring contained in separate domains comprising the first and second network domains; and
   designating one node of the sub-ring network as a Ring Protection Link Owner that imposes a channel block on an adjacent link of the sub-network during normal operation of the sub-ring network thereby guaranteeing a loop free topology in both the first and second domains and restores packet forwarding between the first and second network domains by removing the channel block in a failure mode of the sub-ring network;
   wherein sub-ring control messages comprising Failure Indication Messages are not forwarded through the virtual link during all operations of the sub-ring network.

18. A G.8032 Ethernet ring end node coupled to a first domain and located in a second domain, comprising:
   a first port coupled via a first link to a node in the first domain, wherein the first port participates in a sub-ring instantiated in the first domain;
   a second port coupled via one or more links to an end node in the second domain, wherein the second port participates in a virtual link through the second domain, the virtual link closing the sub-ring network to define a ring topology;
   wherein the first port and the second port are configured to forward packets on sub-ring and through the virtual link in accordance with ITU-T SG15/Q9 recommendation G.8032 (February, 2008) with the sub-ring and the virtual link forming a ring contained in separate domains comprising the first and second network domains;
   wherein the first port imposes a channel block on the first during normal operation of the sub-ring thereby guaranteeing a loop free topology in both the first domain and the second domain and the first port restores packet forwarding on the first link by removing the channel block in a failure mode; and
   wherein sub-ring control messages comprising Failure Indication Messages are not forwarded through the virtual link during all operations of the sub-ring network.

* * * * *